Jan. 13, 1925.　　　　　E. F. BRUNNER　　　　　1,522,941
VEHICLE RIM
Filed Oct. 16, 1920
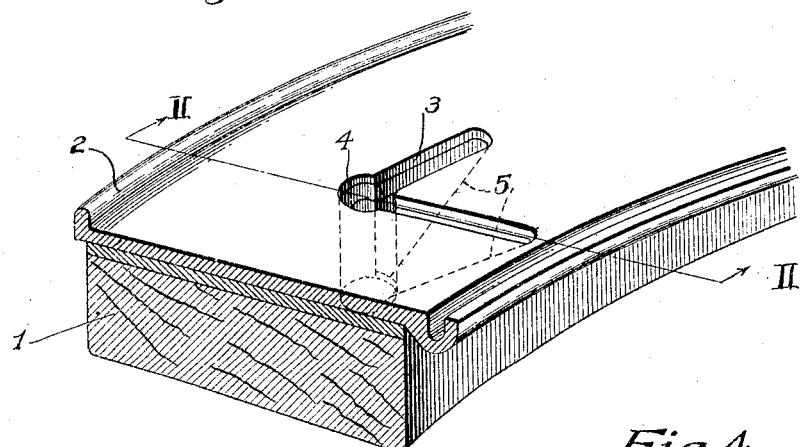
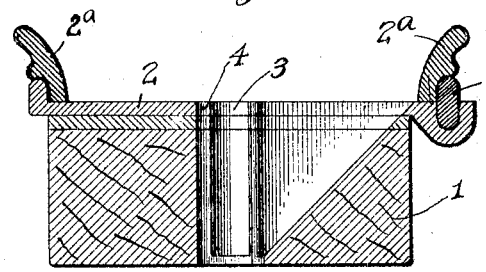
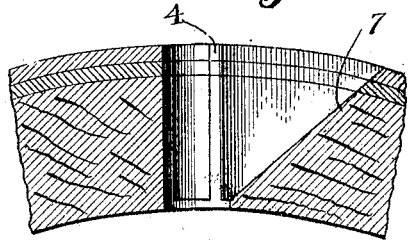
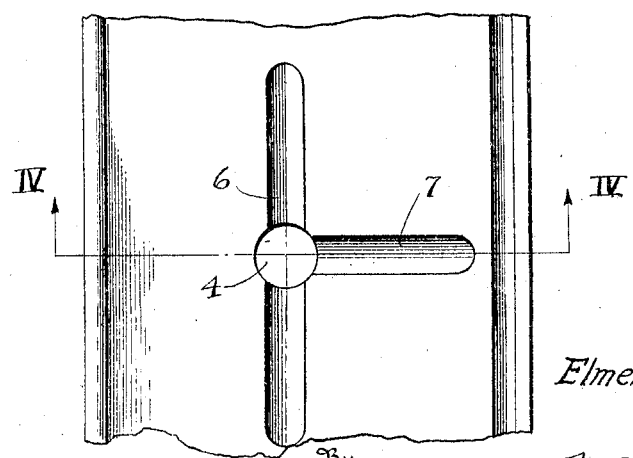
Inventor
Elmer F. Brunner Patented Jan. 13, 1925.

1,522,941

UNITED STATES PATENT OFFICE.

ELMER F. BRUNNER, OF AKRON, OHIO, ASSIGNOR TO THE GOODYEAR TIRE & RUBBER COMPANY, OF AKRON, OHIO, A CORPORATION OF OHIO.

VEHICLE RIM.

Application filed October 16, 1920. Serial No. 417,355.

*To all whom it may concern:*

Be it known that I, ELMER F. BRUNNER, a citizen of the United States, residing at Akron, in the county of Summit and State of Ohio, have invented new and useful Improvements in Vehicle Rims, of which the following is a specification.

My invention relates to vehicle wheels and more particularly to automobile wheels adapted to have pneumatic tires mounted thereon.

The primary object of my invention is to construct an automobile wheel which shall facilitate disposing a pneumatic tire thereon, and which shall also facilitate the removal of the tire therefrom.

Heretofore automobile wheels have been constructed with valve-receiving openings in some portion of the felloe and rim, which were ordinarily but little larger than the diameter of the valve-stem. Such a construction introduced some difficulty in placing a tire upon the wheel, or in removing it therefrom, because of the fact that in order to dispose a tire thereon the valve-stem must necessarily be placed in the opening and the tube to which it is secured must be distorted in order to permit of forcing the remaining portion of the tire about the wheel. In removing a tire from this type of wheel the tube to which the valve is secured must be either greatly distorted in removing the remote portions of the tire or the valve-stem must be forced out of the opening before commencing to remove the tire. Either method is undesirable because of the danger of ruining the tube or casing to which the valve-stem is secured.

One object of my invention, therefore, resides in the construction of a wheel which shall provide for sufficient movement of the valve-stem to materially facilitate the removal of the tire from the wheel, upon which it has been disposed, without undue distortion of the tube to which the valve is secured.

Another object of my invention is to construct a wheel having an enlarged valve-receiving opening which will not affect the mechanical strength of the wheel to any material extent and which will greatly facilitate the mounting and removal of a tire therefrom.

With these and other objects in view my invention will be more fully described, illustrated in the drawings, in which like numerals indicate like parts, and then more fully pointed out in the claims.

In the drawings: Fig. 1 is a perspective view of a portion of the felloe and rim of an automobile wheel constructed in accordance with my invention.

Fig. 2 is a transverse sectional view taken on the line II—II of Fig. 1.

Fig. 3 is a plan view of a portion of a vehicle wheel illustrating a modification of my invention.

Fig. 4 is a sectional view taken on the line IV—IV of Fig. 3.

In practicing my invention, I propose to construct a vehicle wheel with a valve-receiving opening communicating with a plurality of slots so shaped as to permit the valve-stem of the tire to be disposed at an angle in the opening when the tire is being mounted upon the wheel. The same principle obtains in the removal of the tire from the wheel in that a limited movement of the valve-stem is permitted by the particular shape of the slots communicating with the valve-receiving opening formed in the wheel.

Although my invention is particularly adapted for application to detachable or demountable truck tire rims, it will be appreciated from the following description that it may be applied with equal advantage to various types of wheels.

In Figs. 1 and 2 is shown a felloe 1, of a wooden truck wheel having a rim 2 mounted thereon that comprises a base member and a pair of flange rings 2ª, one of which is removably held in place by a split ring 2ᵇ of conventional design. The felloe 1 and the rim base 2 are provided with an L-shaped slot 3 containing a valve-receiving opening 4. The slot 3 is of varying depth, as indicated by the broken lines 5 in Fig. 1 and as clearly shown in Fig. 2.

It will be appreciated that the particular type of slot formed in the wheel shown in Figs. 1 and 2 permits of the ready disposal of a tire upon the wheel because the valve-stem may be disposed at an angle in the portion of the slot which extends transversely with respect to the circumference of the wheel. While the valve-stem is disposed at an angle in the slot, the remaining portions of the tire may be forced upon the rim, which operation will, of course, force the valve-stem into the central valve-receiving opening 4. The particular shape of slot also permits of an easy removal of the tire because the portion of the slot that extends circumferentially with respect to the rim permits of a limited movement of the tire in a circumferential direction, which is frequently necessary in order to loosen the tire and facilitate its removal.

In Figs. 3 and 4 is shown a T-shaped slot in which the head portion 6 thereof extends in a circumferential direction with respect to the rim, and the stem 7 thereof extends toward the edge of the rim, or transversely with respect to the circumference. The valve-receiving opening 4 is, of course, located at the junction of the several communicating slots and the formation is developed by merely providing the L-shaped slot, shown in Figs. 1 and 2, with another slot extending circumferentially with respect to the rim. This modification of my invention possesses the same advantages that reside in the construction shown in Figs. 1 and 2, with the added feature of a greater permissible movement of the valve-stem in a circumferential direction during the removal of a tire from the rim.

It will be appreciated that my invention is particularly adapted to the construction of truck wheels because of the fact that the pneumatic tires employed thereon are ordinarily of relatively large size and are, therefore, more difficult to handle than the pneumatic tires of passenger machines. It is consequently an advantage to employ a construction that materially facilitates the disposal of a tire upon the wheel, or its removal therefrom.

My invention may also be employed to advantage in the construction of wheels for passenger cars.

Although I have shown and described an automobile wheel that may be constructed in accordance with my invention, and set forth several modifications that may be practiced in accordance therewith, it is obvious that minor changes may be made in the particular construction thereof without departing from the spirit or scope of my invention, and I desire, therefore, that no limitations shall be imposed except such as are indicated in the appended claims.

What I claim is:

1. A vehicle wheel comprising a felloe provided with an L-shaped slot formed with tapered bottom terminating in a circular valve-receiving opening on the inside of the felloe, and a tire receiving rim mounted on said felloe having an L-shaped slot adapted to register with the slot in said felloe.

2. A vehicle wheel having a rim adapted to receive a tire and provided with a circumferential slot communicating with a valve-receiving opening said rim also having a transverse slot extending from said opening to a point adjacent the edge of the rim.

3. A vehicle wheel comprising a felloe and a rim therefor having a valve-receiving opening and a lateral and circumferential slot intersecting at said valve-receiving opening.

4. A vehicle wheel rim having a pair of angularly related slots cut thru said rim, said slots intersecting at the valve receiving opening of the rim.

5. A vehicle wheel comprising a rim and a felloe, said rim and felloe having a valve-receiving opening extending therethrough, and a slot of varying depth extending from said opening, the depth of said slot varying directly in accordance with the distance from the valve-receiving opening.

In witness whereof I have hereunto signed my name in the presence of two subscribing witnesses.

ELMER F. BRUNNER.

Witnesses:
 O. E. BEE,
 L. M. HARTMAN.